(12) United States Patent
Kimes et al.

(10) Patent No.: US 9,303,699 B2
(45) Date of Patent: Apr. 5, 2016

(54) ELECTROMECHANICAL ASSEMBLY TO CONTROL THE OPERATING MODE OF A COUPLING APPARATUS

(75) Inventors: John W. Kimes, Wayne, MI (US); Patrick J. McCleer, Jackson, MI (US); Terry O. Hendrick, Cass City, MI (US)

(73) Assignee: Means Industries, Inc., Saginaw, MI (US)

( * ) Notice: Subject to any disclaimer, the term of this patent is extended or adjusted under 35 U.S.C. 154(b) by 696 days.

(21) Appl. No.: 13/370,507

(22) Filed: Feb. 10, 2012

(65) Prior Publication Data

US 2012/0152687 A1 Jun. 21, 2012

Related U.S. Application Data

(63) Continuation-in-part of application No. 13/218,817, filed on Aug. 26, 2011, now Pat. No. 8,888,637, which is a continuation-in-part of application No. PCT/US2011/036636, filed on May 16, 2011.

(60) Provisional application No. 61/463,208, filed on Feb. 14, 2011, provisional application No. 61/421,868, filed on Dec. 10, 2010.

(51) Int. Cl.
   *F16D 41/16* (2006.01)
   *F16D 27/00* (2006.01)
   *F16D 27/108* (2006.01)
   *F16D 41/12* (2006.01)

(52) U.S. Cl.
   CPC ............ *F16D 27/108* (2013.01); *F16D 41/125* (2013.01)

(58) Field of Classification Search
   CPC ............................. F16D 27/108; F16D 41/125
   USPC .......................... 192/43.1, 89.92, 69.1, 43.2
   See application file for complete search history.

(56) References Cited

U.S. PATENT DOCUMENTS

| 2,863,326 | A | 12/1958 | Maurice et al. |
| 2,866,109 | A | 12/1958 | Watson |

(Continued)

FOREIGN PATENT DOCUMENTS

JP       09196128       7/1997

OTHER PUBLICATIONS

Webster's Encyclopedic Unabridged Dictionary 1989.*

(Continued)

*Primary Examiner* — Robert Hodge
*Assistant Examiner* — Ryan Dodd
(74) *Attorney, Agent, or Firm* — Brooks Kushman P.C.

(57) ABSTRACT

An electromechanical assembly to control the operating mode of a coupling apparatus is provided. The assembly includes a first subassembly including a stator having at least one electromagnetically inductive coil to create a magnetic flux when the at least one coil is energized. At least one bi-directionally movable rod has a free end adapted for connection to a strut of the coupling apparatus for selective, small displacement strut movement. An actuator is operatively connected to the at least one rod for selective bi-directional shifting movement along a rotational axis between a first position of the actuator which corresponds to a first mode of the coupling apparatus and a second position of the actuator which corresponds to a second mode of the coupling apparatus. A magnetic control force is applied to the actuator when the at least one coil is energized to cause the actuator to move between positions.

23 Claims, 5 Drawing Sheets

(56) References Cited

U.S. PATENT DOCUMENTS

| | | | |
|---|---|---|---|
| 2,966,975 A | 1/1961 | Wiedmann et al. | |
| 2,969,134 A | 1/1961 | Wiedmann et al. | |
| 4,050,560 A | 9/1977 | Torstenfelt | |
| 4,340,133 A | 7/1982 | Blersch | |
| 5,046,594 A | 9/1991 | Kakinuma | |
| 5,052,534 A | 10/1991 | Gustin et al. | |
| 5,070,978 A | 12/1991 | Pires | |
| 5,206,573 A | 4/1993 | McCleer et al. | |
| 5,231,265 A | 7/1993 | Hackett et al. | |
| 5,362,293 A | 11/1994 | Romanauskas | |
| 5,387,854 A | 2/1995 | McCleer et al. | |
| 5,394,321 A | 2/1995 | McCleer et al. | |
| 5,453,598 A | 9/1995 | Hackett et al. | |
| 5,597,057 A | 1/1997 | Ruth et al. | |
| 5,638,929 A | 6/1997 | Park | |
| 5,642,009 A | 6/1997 | McCleer et al. | |
| 5,678,668 A | 10/1997 | Sink | |
| 5,827,148 A | 10/1998 | Seto et al. | |
| 5,918,715 A | 7/1999 | Ruth et al. | |
| 5,924,510 A | 7/1999 | Itoh et al. | |
| 5,927,455 A | 7/1999 | Baker et al. | |
| 6,065,576 A | 5/2000 | Shaw et al. | |
| 6,075,302 A | 6/2000 | McCleer | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,503,167 B1 | 1/2003 | Sturm | |
| 6,814,201 B2 | 11/2004 | Thomas | |
| 6,827,167 B2 | 12/2004 | Cikanek et al. | |
| 6,846,257 B2 | 1/2005 | Baker et al. | |
| 6,953,409 B2 | 10/2005 | Schmidt et al. | |
| 6,982,502 B1 | 1/2006 | Sendaula et al. | |
| 7,093,512 B2 | 8/2006 | Ibamoto et al. | |
| 7,153,228 B2 | 12/2006 | Fujiu et al. | |
| 7,198,587 B2 | 4/2007 | Samie et al. | |
| 7,223,198 B2 | 5/2007 | Kimes et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,349,010 B2 | 3/2008 | Bryant et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,540,365 B2 * | 6/2009 | Juergensmeyer et al. | 192/84.2 |
| 7,624,851 B2 * | 12/2009 | Seeger et al. | 192/18 A |
| 7,690,455 B2 | 4/2010 | Kano et al. | |
| 7,806,795 B2 | 10/2010 | Oba et al. | |
| 7,898,121 B2 | 3/2011 | Ramsay et al. | |
| 7,942,781 B2 | 5/2011 | Kimes | |
| 8,276,725 B2 * | 10/2012 | Swales | F16D 27/118 192/43.1 |
| 8,286,772 B2 * | 10/2012 | Eisengruber | 192/43.1 |
| 8,418,825 B2 * | 4/2013 | Bird | 192/46 |
| 8,443,956 B2 | 5/2013 | Bauer et al. | |
| 8,522,943 B2 * | 9/2013 | Tate et al. | 192/84.92 |
| 2001/0049306 A1 | 12/2001 | Tanaka | |
| 2004/0110594 A1 | 6/2004 | Goto | |
| 2004/0159517 A1 | 8/2004 | Thomas | |
| 2006/0138777 A1 | 6/2006 | Hofbauer et al. | |
| 2006/0185957 A1 | 8/2006 | Kimes et al. | |
| 2007/0056825 A1 | 3/2007 | Fetting, Jr. et al. | |
| 2007/0278061 A1 | 12/2007 | Wittkopp et al. | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2008/0277891 A1 | 11/2008 | Adams, III et al. | |
| 2009/0084653 A1 | 4/2009 | Holmes | |
| 2009/0098968 A1 | 4/2009 | Maguire et al. | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0044141 A1 | 2/2010 | Kimes et al. | |
| 2010/0071497 A1 | 3/2010 | Reisch et al. | |
| 2010/0119389 A1 | 5/2010 | Lazebnik et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0011694 A1 * | 1/2011 | Swales et al. | 192/48.2 |
| 2011/0140451 A1 | 6/2011 | Sharples et al. | |
| 2011/0177900 A1 | 7/2011 | Simon | |
| 2011/0215575 A1 | 9/2011 | Hofbauer et al. | |
| 2012/0145505 A1 | 6/2012 | Kimes | |
| 2014/0102844 A1 | 4/2014 | Greene et al. | |
| 2014/0190785 A1 | 7/2014 | Fetting et al. | |
| 2014/0284167 A1 | 9/2014 | Kimes | |

OTHER PUBLICATIONS

International Preliminary Report on Patentability; International application No. PCT/US2012/025046; date of issuance of report Aug. 21, 2013.

International Search Report and Written Opinion; International Application No. PCT/US2012/025046; date of mailing May 21, 2012.

International Search Report and Written Opinion; International application No. PCT/US14/56749; date of mailing Dec. 24, 2014.

International Search Report and Written Opinion; related international application No. PCT/US2014/057140; date of mailing Feb. 26, 2015.

International Search Report and Written Opinion; related international application No. PCT/US2014/056716; date of mailing Mar. 3, 2015.

Notice of Rejection; English Summary; corresponding Japanese application No. 2013-553658; draft date Dec. 24, 2015.

* cited by examiner

ELECTROMECHANICAL ASSEMBLY TO CONTROL THE OPERATING MODE OF A COUPLING APPARATUS

CROSS-REFERENCE TO RELATED APPLICATIONS

This application claims the benefit of U.S. provisional patent application No. 61/463,208 filed Feb. 14, 2011. This application is also a continuation-in-part of U.S. patent application Ser. No. 13/218,817 filed Aug. 26, 2011 which, in turn, is a continuation-in-part of U.S. national phase of PCT Application No. PCT/US11/36636 filed May 16, 2011 which claims the benefit of U.S. provisional patent application No. 61/421,868 filed Dec. 10, 2010, the disclosures of which are incorporated in their entirety by reference herein.

TECHNICAL FIELD

This invention relates to electromechanical assemblies to control the operating mode of coupling apparatus such as controllable one-way clutches (OWCs).

OVERVIEW

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of over-running in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 2009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0138777; 2006/0185957; 2004/0110594; and the following U.S. Pat. Nos.: 7,942,781; 7,806,795; 7,690,455; 7,491,151; 7,484,605; 7,464,801; 7,349,010; 7,275,628; 7,256,510; 7,223,198; 7,198,587; 7,093,512; 6,953,409; 6,846,257; 6,814,201; 6,503,167; 6,193,038; 4,050,560; 4,340,133; 5,597,057; 5,918,715; 5,638,929; 5,362,293; 5,678,668; 5,070,978; 5,052,534; 5,387,854; 5,231,265; 5,394,321; 5,206,573; 5,453,598; 5,642,009; 6,075,302; 6,065,576; 6,982,502; 7,153,228; 5,924,510; and 5,918,715.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

A clevis fastener is a three piece fastener system consisting of a clevis, clevis pin, and tang. The clevis is a U-shaped piece that has holes at the end of the prongs to accept the clevis pin. The clevis pin is similar to a bolt, but is only partially threaded or unthreaded with a cross-hole for a cotter pin. The tang is the piece that fits between the clevis and is held in place by the clevis pin. The combination of a simple clevis fitted with a pin is commonly called a shackle, although a clevis and pin is only one of the many forms a shackle may take.

Clevises are used in a wide variety of fasteners used in the farming equipment, sailboat rigging, as well as the automotive, aircraft and construction industries. They are also widely used to attach control surfaces and other accessories to servos in model aircraft. As a part of a fastener, a clevis provides a method of allowing rotation in some axes while restricting rotation in others.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

In one embodiment, an electromechanical assembly to control the operating mode of a coupling apparatus having drive and driven members supported for rotation relative to one another about a common rotational axis and at least one strut for selectively mechanically coupling the members together is provided. The assembly includes a first subassembly including a stator having at least one electromagnetically inductive coil to create a magnetic flux when the at least one coil is energized. The assembly further includes a second subassembly adapted for coupling with one of the members of the coupling apparatus to rotate therewith. The second subassembly is supported for rotation relative to the first subassembly about the rotational axis when coupled to the coupling apparatus. The second subassembly includes at least one bi-directionally movable rod. Each rod has a free end adapted for connection to a strut of the coupling apparatus for selective, small displacement strut movement. The second subassembly also includes an actuator operatively connected to the at least one rod for selective bi-directional shifting movement along the rotational axis between a first position of the actuator which corresponds to a first mode of the coupling apparatus and a second position of the actuator which corresponds to a second mode of the coupling apparatus. A magnetic control force is applied to the actuator when the at least one coil is energized to cause the actuator to move between the first and second positions along the rotational axis.

The second subassembly may include at least one biasing member for exerting at least one biasing force on the actuator along the rotational axis when the actuator moves between its first and second positions along the rotational axis.

The second subassembly may include a pair of spaced biasing members for exerting corresponding biasing forces on the actuator in opposite directions along the rotational axis when the actuator moves between its first and second positions along the rotational axis.

The second subassembly may include a hub adapted for coupling with the one of the members of the coupling apparatus and supported for rotation relative to the first subassembly about the rotational axis. The hub may slidably support the actuator during shifting movement along the rotational axis.

The second subassembly may include a pair of spaced stops supported on the hub to define the first and second positions of the actuator.

The second subassembly may include a set of spaced guide pins sandwiched between an inner surface of the actuator and an outer surface of the hub and extending along the rotational axis. The actuator may slide on the guide pins during shifting movement of the actuator along the rotational axis and the guide pins may pilot the actuator on the hub.

The stator may include a ferromagnetic housing having spaced apart fingers and an electromagnetically inductive coil housed between adjacent fingers.

The actuator may include an inner part and an outer part having a magnetic annular ring sandwiched between a pair of ferromagnetic backing rings. The magnetic control force may magnetically bias the fingers and their corresponding backing rings into alignment.

The actuator may be a permanent magnet actuator.

The stator may include a pair of spaced electromagnetically inductive coils.

In another embodiment, an electromechanical assembly to control the operating mode of a coupling apparatus having drive and driven members supported for rotation relative to one another about a common rotational axis and at least one forward strut and at least one reverse strut for selectively mechanically coupling the members together is provided. The assembly includes a first subassembly including a first stator having at least one electromagnetically inductive first coil to create a first magnetic flux when the at least one first coil is energized and a second stator having at least one electromagnetically inductive second coil to create a second magnetic flux when the at least one second coil is energized. The assembly further includes a second subassembly adapted for coupling with one of the members of the coupling apparatus to rotate therewith. The second subassembly is supported for rotation relative to the first subassembly about the rotational axis when coupled to the coupling apparatus. The second subassembly includes at least one bi-directionally movable first rod. Each first rod has a free end adapted for connection to a forward strut of the coupling apparatus for selective, small displacement forward strut movement. The second subassembly also includes a first actuator operatively connected to the at least one first rod for selective bi-directional shifting movement along the rotational axis between a first position of the first actuator which corresponds to a first mode of the coupling apparatus and a second position of the first actuator which corresponds to a second mode of the coupling apparatus. A first magnetic control force is applied to the first actuator when the at least one first coil is energized to cause the first actuator to move between its first and second positions along the rotational axis. The second subassembly further includes at least one bi-directionally movable second rod. Each second rod has a free end adapted for connection to a reverse strut of the coupling apparatus for selective, small displacement reverse strut movement. The second subassembly also includes a second actuator operatively connected with the at least one second rod for bi-directional shifting movement thereof along the rotational axis between a first position of the second actuator which corresponds to a third mode of the coupling apparatus and a second position of the second actuator which corresponds to a fourth mode of the coupling apparatus. A second control magnetic force is applied to the second actuator when the at least one second coil is energized to cause the second actuator to move between its first and second positions along the rotational axis.

The second subassembly may include at least one biasing first member for exerting at least one biasing force on the first actuator along the rotational axis when the first actuator moves between its first and second positions along the rotational axis and at least one biasing second member for exerting at least one biasing force on the second actuator along the rotational axis when the second actuator moves between its first and second positions along the rotational axis.

The second subassembly may include a first pair of spaced biasing members for exerting corresponding biasing forces on the first actuator in opposite directions along the rotational axis when the first actuator moves between its first and second positions along the rotational axis and a second pair of spaced biasing members for exerting corresponding biasing forces on the second actuator in opposite directions along the rotational axis when the second actuator moves between its first and second positions along the rotational axis.

The second subassembly may include a hub adapted for coupling with the one of the members of the coupling apparatus and supported for rotation relative to the first subassembly about the rotational axis. The hub may slidably support the first and second actuators during corresponding shifting movement along the rotational axis.

The second subassembly may include a first pair of spaced stops supported on the hub to define the first and second positions of the first actuator and a second pair of spaced stops supported on the hub to define the first and second positions of the second actuator.

The second subassembly may include a set of spaced guide pins sandwiched between an inner surface of the first and second actuators and an outer surface of the hub and extending along the rotational axis. The actuators may slide on the guide pins during shifting movement of the actuators along the rotational axis. The guide pins may pilot the actuators on the hub.

Each stator may include a ferromagnetic housing having spaced apart fingers and an electromagnetically inductive coil housed between adjacent fingers.

Each actuator may include an inner part and an outer part having a magnetic annular ring sandwiched between a pair of ferromagnetic backing rings and the magnetic control forces may magnetically bias the fingers and their corresponding backing rings into alignment.

Each actuator may be a permanent magnet actuator.

Each stator may include a pair of spaced electromagnetically inductive coils.

The second actuator may have at least one aperture extending completely therethrough to allow each first rod to move bi-directionally therethrough.

DESCRIPTION OF EXAMPLE EMBODIMENTS

Figure 1:
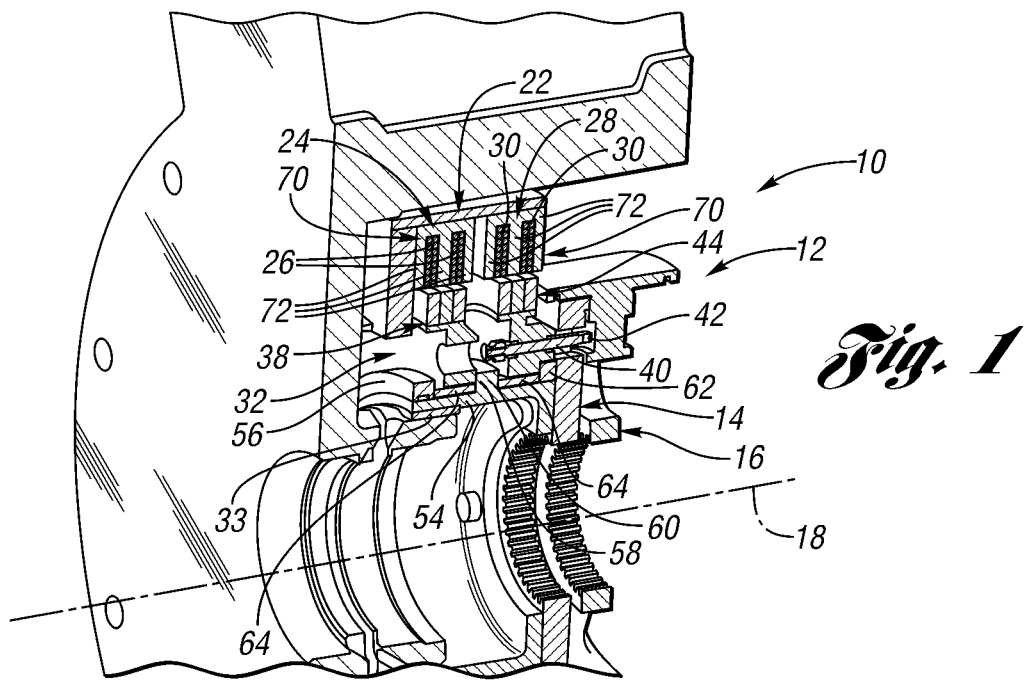
FIG. 1 is a perspective view, partially broken away and in cross-section, of an electromechanical assembly including a reciprocating rod and a first subassembly of a controllable coupling assembly wherein the reciprocating rod of the electromechanical assembly controls the operating mode of the coupling assembly.
Figure 2:
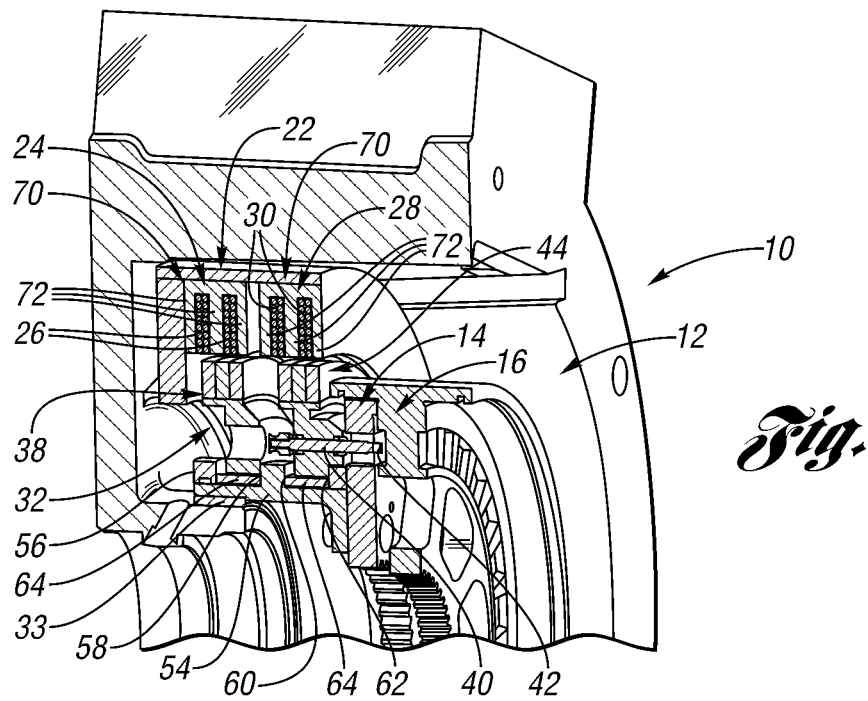
FIG. 2 is a different perspective view, partially broken away and in cross-section, of the assemblies of FIG. 1.
Figure 3:
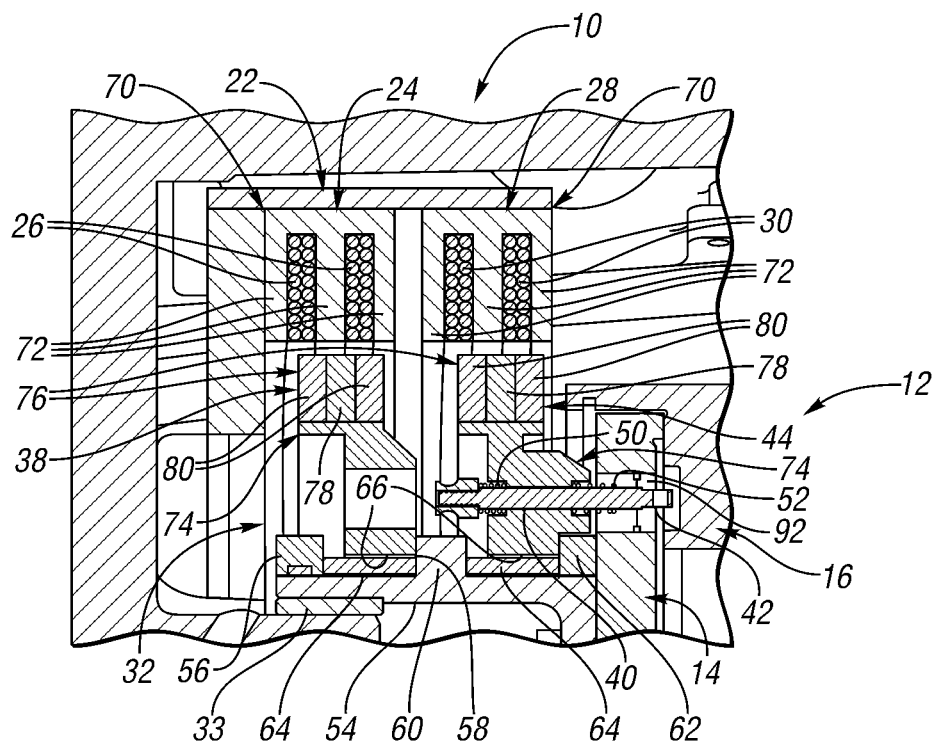
FIG. 3 is an enlarged front view, partially broken away and in cross-section, of the assemblies of FIGS. 1 and 2.
Figure 4:
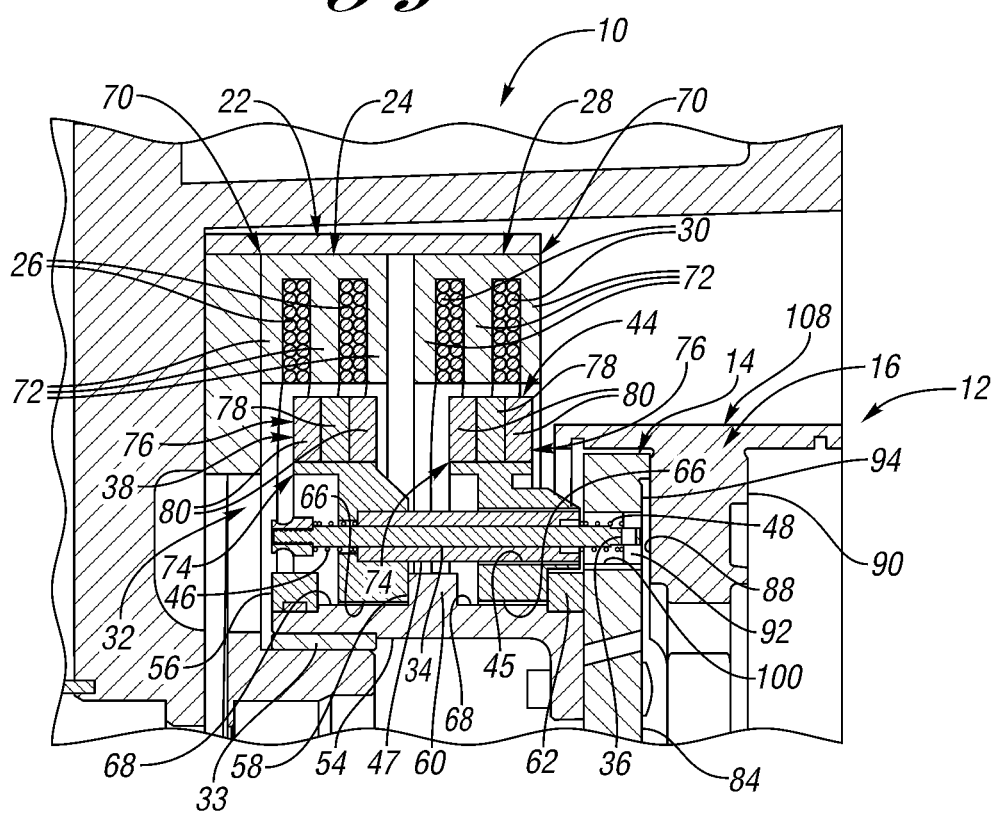
FIG. 4 is an enlarged front view, partially broken away and in cross-section, of the assemblies of FIGS. 1 and 2 but showing a second reciprocating rod to control the operating mode of the coupling assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1-4, there is illustrated an electromechanical assembly, generally indicated at 10, to control the operating mode of a coupling apparatus, generally indicated at 12, having drive and driven members 14 and 16, respectively, supported for rotation relative to one another about a common rotational axis 18. The drive member 14 may be a pocket plate and the driven member 16 may be a notch plate. The coupling apparatus or assembly 12 includes at least one (preferably two) forward strut 20 and at least one (preferably two) reverse strut 20 for selectively mechanically coupling the members 14 and 16 together and change the operating mode of the assembly 12. Preferably, the struts 20 are spaced at 90° intervals about the axis 18.

The assembly 10 includes a first subassembly 22 including a first stator 24 having at least one (preferably two) electromagnetically inductive first coil 26 to create a first magnetic flux when at least one first coil 26 is energized. The subassembly 22 may also include a second stator 28 having at least one (preferably two) electromagnetically inductive second coil 30 to create a second magnetic flux when the at least one second coil 30 is energized.

The assembly 10 also includes a second subassembly 32 adapted for coupling with one of the members 14 or 16 (preferably the member 14) of the coupling apparatus 12 to rotate therewith. The second subassembly 32 is supported for rotation relative to the first subassembly 22 by a bushing 33 about the rotational axis 18 when coupled to the coupling apparatus 12. The second subassembly 32 includes at least one (preferably two) bi-directionally movable first rod 34. Each first rod 34 has a free end 36 adapted for connection to a forward strut 20 of the coupling apparatus 12 for selective, small displacement forward strut movement.

The second subassembly 32 also includes a first actuator 38 operatively connected to the at least one first rod 34 for selective bi-directional shifting movement along the rotational axis 18 between a first position of the first actuator 38 which corresponds to a first mode of the coupling apparatus 12 and a second position of the first actuator 38 which corresponds to a second mode of the coupling apparatus 12. When two first rods 34 are provided, the first rods are spaced 180° apart from one another. The first and second modes may be locked and unlocked (i.e. free wheeling) modes.

A first magnetic control force is applied to the first actuator 38 when the at least one first coil 26 is energized to cause the first actuator 38 to move between its first and second positions along the rotational axis 18.

The second subassembly 32 further includes at least one (preferably two) bi-directionally movable second rod 40. Each second rod 40 has a free end 42 adapted for connection to a reverse strut 20 of the coupling apparatus 12 for selective, small displacement reverse strut movement. The second subassembly 32 also includes a second actuator 44 operatively connected with the at least one second rod 40 for bi-directional shifting movement thereof along the rotational axis 18 between a first position of the second actuator 44 which corresponds to a third mode of the coupling apparatus 12 and a second position of the second actuator 44 which corresponds to a fourth mode of the coupling apparatus 12. When two second rods 40 are provided, the second rods are spaced 180° apart from each other but 90° apart from the first rods 34. The third and fourth modes may be locked and unlocked (i.e. free wheeling) modes.

A second control magnetic force is applied to the second actuator 44 when the at least one second coil 30 is energized to cause the second actuator 44 to move between its first and second positions along the rotational axis 18.

The second subassembly 32 includes a first pair of spaced biasing springs or members 46 and 48 for exerting corresponding biasing forces on the first actuator 38 in opposite directions along the rotational axis 18 when the first actuator 38 moves between its first and second positions along the rotational axis 18. Each face of each actuator 38 or 44 has clearance holes and spring pockets for the connecting rods 34 and 40, respectively, and their respective springs. When the actuators 38 and 44 move they push/pull their respective springs trapped between their faces and the ends of their corresponding rods 34 and 40.

The second subassembly 32 also includes a second pair of spaced biasing springs or members 50 and 52 for exerting corresponding biasing forces on the second actuator 44 in opposite directions along the rotational axis 18 when the second actuator 44 moves between its first and second positions along the rotational axis 18. Axial movement of the actuators 38 and 44 puts a biasing load onto the struts 20 via the springs 46, 48, 50 and 52 to either engage or disengage the struts 20. By reversing the current direction in the stators 24 and 28 their corresponding actuator 38 or 44 is moved back and forth from "off" to "on."

The second subassembly 32 includes a hub 54 adapted for coupling with the one of the members 14 and 16 (preferably the member 14) of the coupling apparatus 12. The hub 54 is supported for rotation relative to the first subassembly 22 by the bushing 33 about the rotational axis 18. The hub 54 slidably supports the first and second actuators 38 and 44, respectively, during corresponding shifting movement along the rotational axis 18.

The second subassembly 32 includes a first pair of spaced stops 56 and 58 supported on the hub 54 to define the first and second positions of the first actuator 38. The second subassembly 32 also includes a second pair of spaced stops 60 and 62 supported on the hub 54 to define the first and second positions of the second actuator 44.

The second subassembly 32 also includes a set of spaced guide pins 64 sandwiched between inner surfaces 66 of the first and second actuators 38 and 44, respectively, and an outer surface 68 of the hub 54 and extending along the rotational axis 18. The inner surfaces 66 and the outer surface 68 have V-shaped grooves or notches formed therein to hold the guide pins 64. The actuators 38 and 44 slide on the guide pins 64 during shifting movement of the actuators 38 and 44 along the rotational axis 18. The guide pins 64 pilot the actuators 38 and 44 on the hub 54. The hub 54 also distributes oil to the guide pins 64.

Each of the stators 24 and 28 includes a ferromagnetic housing 70 having spaced apart fingers 72 and an electromagnetically inductive coil 26 or 30 housed between adjacent fingers 72.

Each of the actuators 38 and 44 includes an annular inner part 74 and an annular outer part 76 connected thereto and having a magnetic annular ring 78 sandwiched between a pair of ferromagnetic backing rings 80. The magnetic control forces magnetically bias the fingers 72 and their corresponding backing rings 80 into alignment upon coil energization. These forces latch their respective actuator 38 or 40 in the "on" and "off" positions. The rings 78 and 80 are acted upon by their respective stators 24 and 28 to move their respective actuators 38 and 40.

The second actuator 44 has at least one (preferably two) aperture 45 extending completely therethrough to allow each first rod 34 to move bi-directionally therethrough. A hollow cylindrical bushing 47 slidably supports each first rod 34 in the at least one aperture 45 during bi-directional shifting movement thereof.

Figure 5:
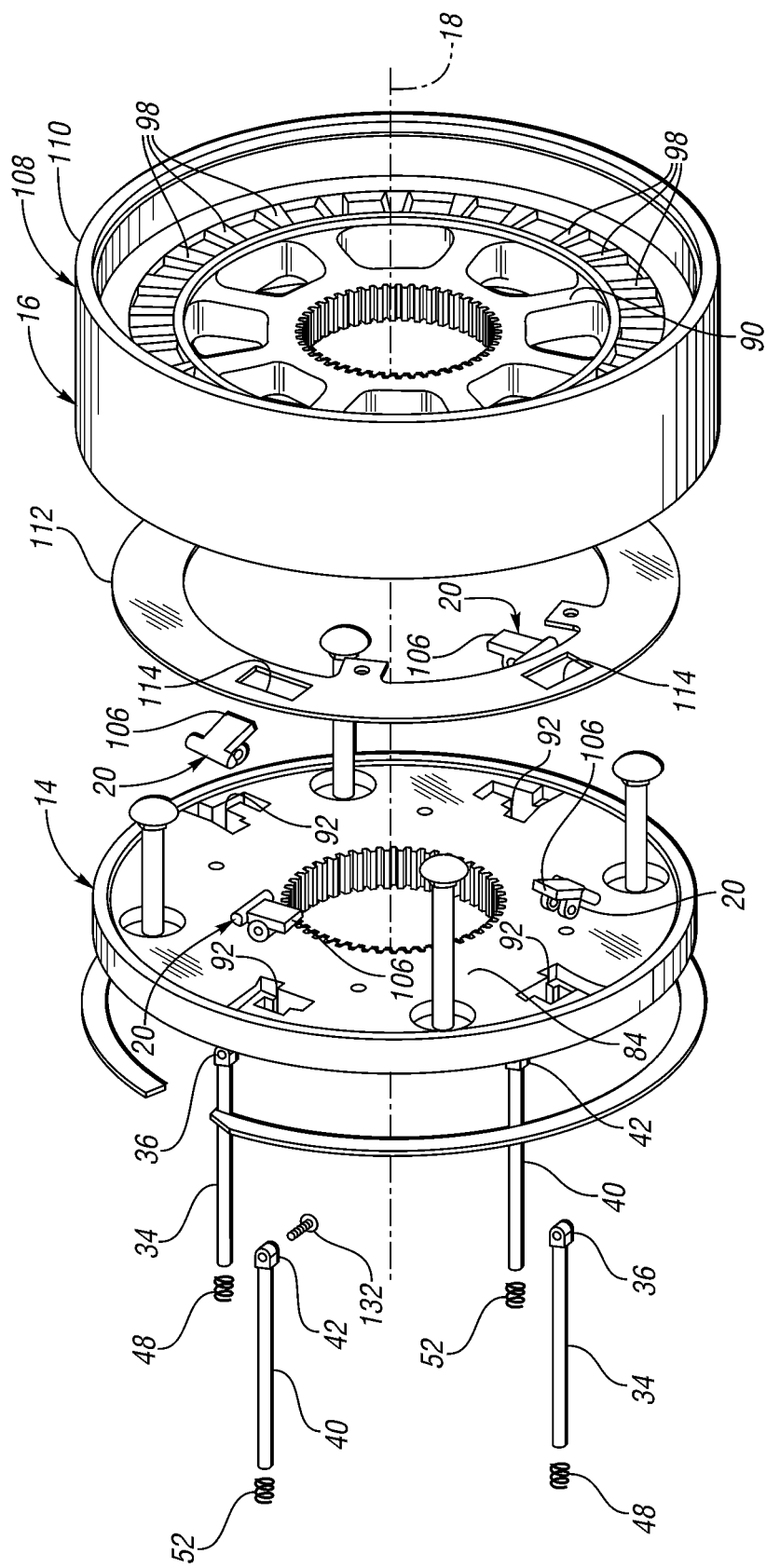
FIG. 5 is an exploded perspective view showing the first subassembly of the coupling assembly, first and second sets of rods of the electromechanical assembly and corresponding forward and reverse struts.
Figure 6:
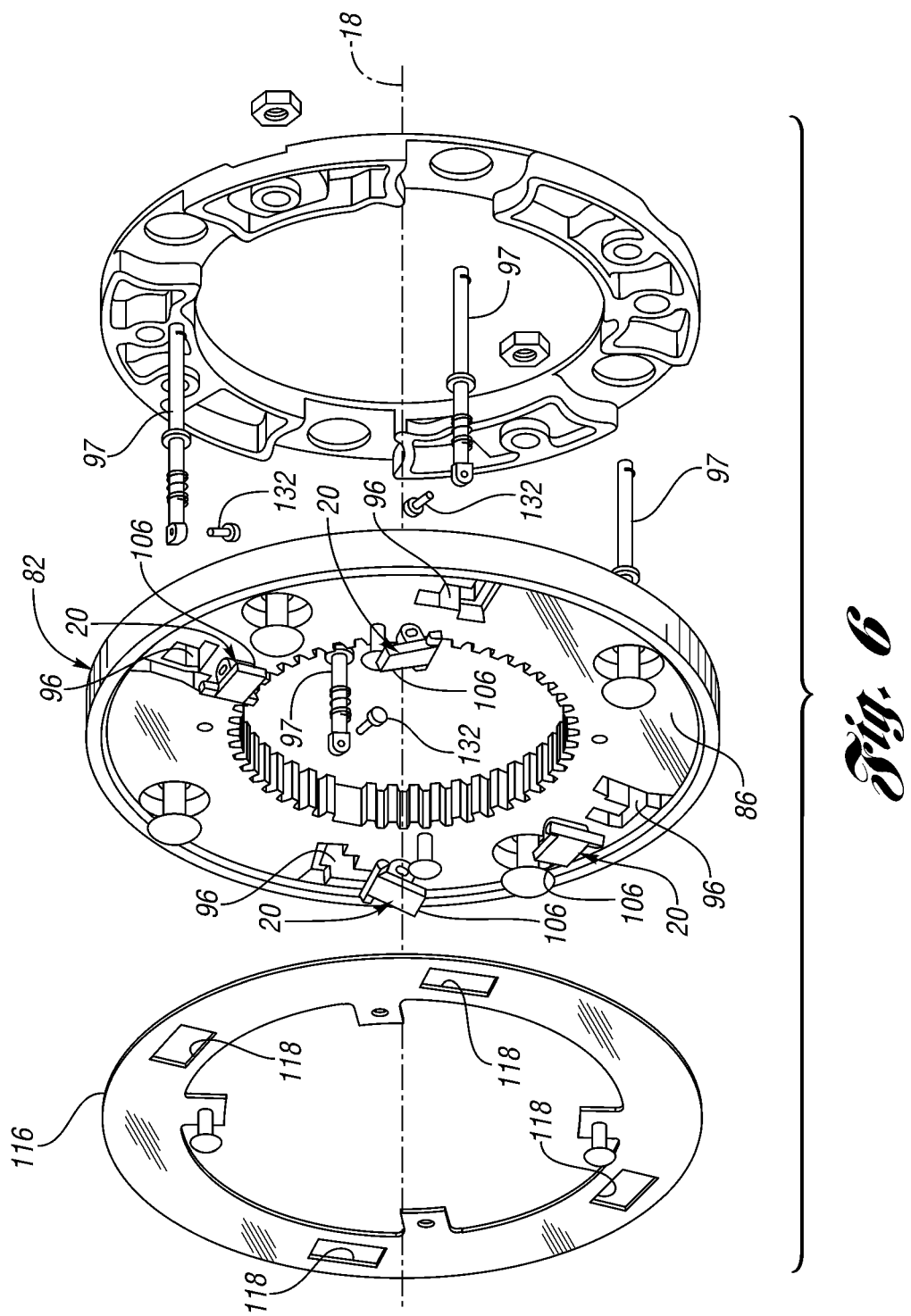
FIG. 6 is an exploded perspective view showing a second subassembly of the coupling assembly, third and fourth sets of rods of a second electromechanical assembly and corresponding forward and reverse struts.

Referring now to FIGS. 5 and 6, the coupling assembly or apparatus 12 comprises a controllable clutch assembly including first and second clutch subassemblies. The assembly 12 includes the drive or first clutch member 14, the driven or second clutch member 16 and a third or drive clutch member 82 all supported for rotation relative to one another about the common rotational axis 18. The first clutch member 14 has a coupling first face 84 oriented to face axially in a first direction along the rotational axis 18. The third clutch member 82 has a coupling third face 86 oriented to face axially in a second direction along the rotational axis 18. The second clutch member 16 has a coupling second face 88 opposed to the first face 84 and oriented to face axially in the second direction along the rotational axis 18. The second clutch member 16 also has a coupling fourth face 90 opposed to the third face 86 and oriented to face axially in the first direction along the rotational axis 18.

The first face 84 has a first set of pockets 92 spaced about the rotational axis 18. Each pocket 92 of the first set has a strut 20 of a first set of struts 20 received thereby.

The second face 88 has a first set of locking formations 94 that are engaged by the struts 20 upon projecting outwardly from the first set of pockets 92 to prevent relative rotation of the first and second clutch members 14 and 16 with respect to each other in at least one direction about the axis 18.

The third face 86 has a second set of pockets 96 spaced about the rotational axis 18. Each pocket 96 of the second set has a strut 20 of a second set of struts 20 received thereby. Each strut 20 contained within the second set of pockets 96 is connected or coupled to its respective rod 97 of a second electromechanical assembly substantially identical in structure and operation to the first electromechanical assembly. Consequently, other than the rods 97, the second electromechanical assembly is neither shown nor described.

The fourth face 90 has a second set of locking formations 98 that are engaged by the second set of struts 20 upon projecting outwardly from the second set of pockets 96 to prevent relative rotation of the second and third clutch members 16 and 82 with respect to each other in at least one direction about the axis 18. The first and second clutch members 14 and 16, respectively, form the first clutch subassembly and the second and third clutch members 16 and 82, respectively, form the second clutch subassembly.

The first clutch member 14 has a first set of passages 100 spaced about the rotational axis 18 and in communication with their respective pockets 92 of the first set of pockets 92 to communicate an actuating force (preferably by the rods 34 and 40) to their respective strut 20 within its respective pocket 92 so that its respective strut 20 moves into contact with the first set of locking formations 94 to couple the first and second clutch members 14 and 16, respectively, for rotation with each other in at least one direction about the axis 18.

The third clutch member 82 has a second set of passages (not shown) spaced about the rotational axis 18 and in communication with their respective pockets 96 of the second set of pockets 96 to communicate an actuating force (preferably by the driven rods 97 as previously described) to their respective strut 20 within its respective pockets 96 so that its respective strut 20 moves into contact with the second set of locking formations 98 to couple the second and third clutch members 16 and 82, respectively, for rotation with each other in at least one direction about the axis 18.

Each strut 20 of the first and second sets of struts 20 has an end 106 that is pivotally movable outwardly of its respective pocket 92 or 96.

The second clutch member 16 includes a housing 108 having an end wall 110 for housing the first and third clutch members 14 and 82, respectively.

Each of the subassemblies is independently controllable.

The first set of struts 20 includes at least one reverse strut 20 and at least one forward strut 20. A first element 112 is supported between the first and second clutch members 14 and 16, respectively. The first element 112 has at least one opening 114 extending completely therethrough to allow the forward and reverse struts 20 of the first set to extend therethrough and lock the first and second clutch members 14 and 16, respectively, together to prevent relative rotation between the first and second clutch members 14 and 16, respectively, in either direction about the axis 18.

The second set of struts 20 includes at least one reverse strut 20 and at least one forward strut 20. A second element 116 is supported between the second and third clutch members 16 and 82. The second element 116 has at least one opening 118 extending completely therethrough to allow the forward and reverse struts 20 of the second set to extend therethrough and lock the second and third clutch members 16 and 82, respectively, together to prevent relative rotation between the second and third clutch members 16 and 82, respectively, in either direction about the axis 18.

The first, second, third and fourth faces 84, 88, 86 and 90, respectively, are generally flat and face generally axially. The first, second, third and fourth faces 84, 88, 86 and 90, respectively, are generally annular and extend generally radially with respect to the rotational axis.

Figure 7:
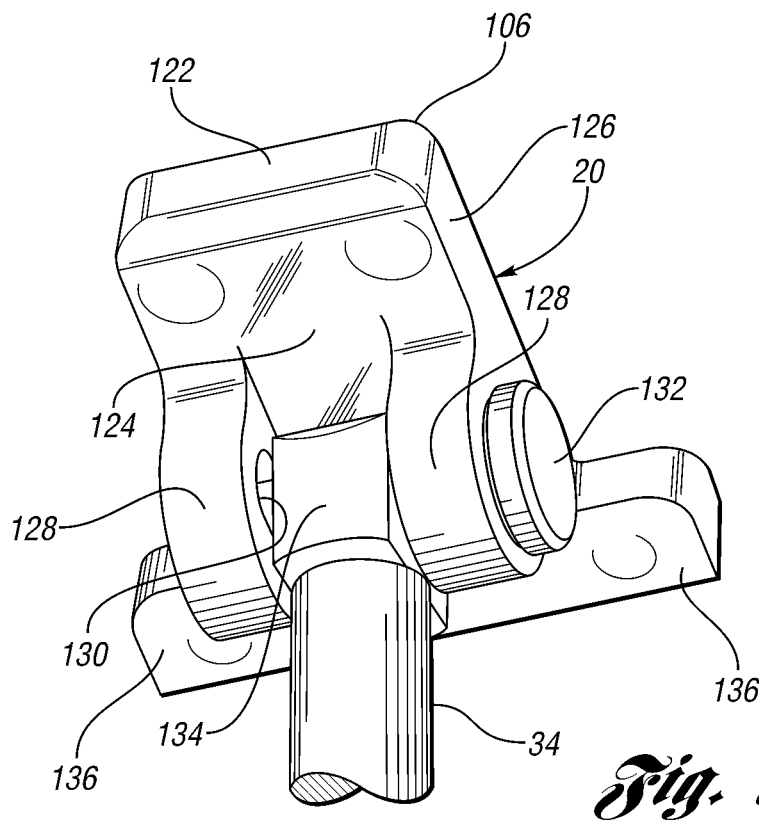
FIG. 7 is a bottom perspective view of a clevis-shaped strut (either forward or reverse) and interconnected rod, partially broken away.
Figure 8:
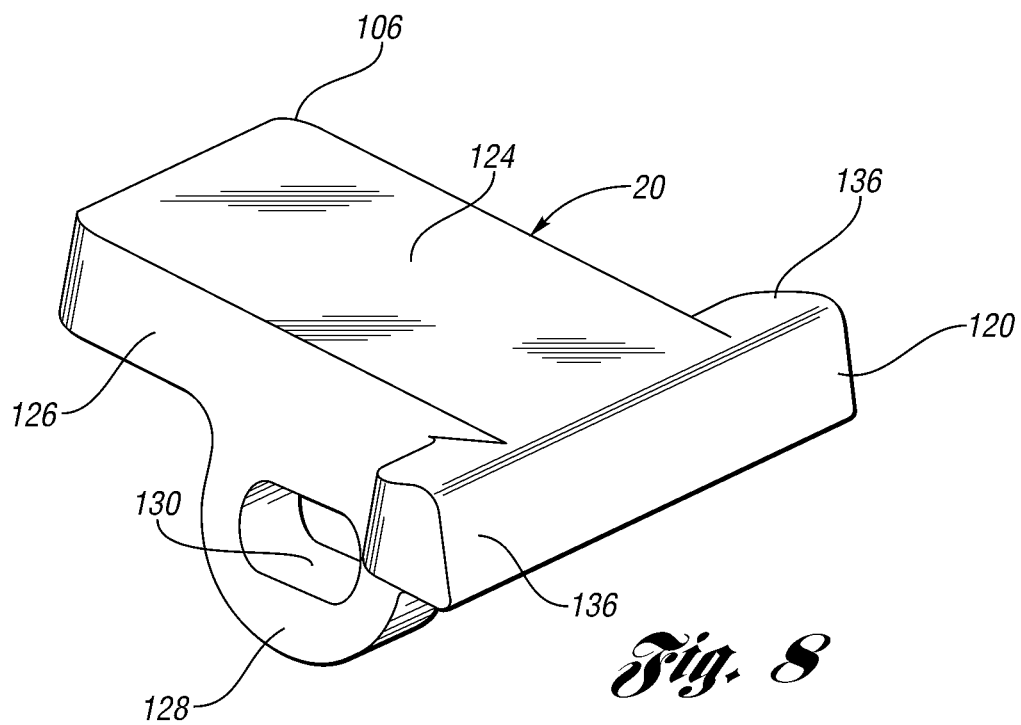
FIG. 8 is a top perspective view of the strut of FIG. 7.

Referring now to FIGS. 7 and 8, there is illustrated one of the clevis-shaped struts 20 for the planar one-way clutch or apparatus 12. Each strut 20 comprises a member-engaging canted first end surface 120 and a member-engaging canted second end surface 122 diametrically opposite the first end surface 120. Each strut 20 also includes a main body portion 124 between the end surfaces 120 and 122. The main body portion includes a pair of spaced-apart side surfaces 126. Each strut 20 further includes a pair of spaced-apart, projecting leg portions 128. Each of the leg portions 128 extend from the main body portion 124 proximate one of the side surfaces 126. Each leg portion 128 has an aperture 130 adapted to receive a pivot pin 132 between the leg portions 128 to allow rotational movement of the strut 20 in responses to reciprocating movement of the rods 34, 40 or 97. A free end 134 of the rod 34, 40 or 97 is adapted to be coupled to the strut 20 via the pivot pin 132.

Each of the apertures 130 is preferably an oblong aperture 130 to receive the pivot pin 132 to allow both rotational and translational movement of the strut 20 in response to reciprocating movement of the rod 34, 40 or 97. Each strut 20 also includes a pair of oppositely projecting canted ears 136 which extend laterally from the main body portion 124 proximate the first end surface 120. Each strut 20 is preferably an injection molded strut such as a metal injection molded strut.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electromechanical assembly to control the operating mode of a coupling apparatus having first and second coupling members supported for rotation relative to one another about a common rotational axis and at least one strut for selectively mechanically coupling the members together, the assembly comprising:
 a first subassembly including a stator having at least one electromagnetically inductive coil to create a magnetic flux when the at least one coil is energized, and ferromagnetic fingers adjacent the at least one coil; and
 a second subassembly including at least one bi-directionally movable rod, each rod having a free end adapted to actuate a strut of the coupling apparatus for selective, small displacement strut movement, and a magnetic actuator operatively connected to each rod for selective bi-directional shifting movement along the rotational axis between a first position of the actuator which corresponds to a first mode of the coupling apparatus and a second position of the actuator which corresponds to a second mode of the coupling apparatus, wherein a magnetic control force is applied to the actuator when the at least one coil is energized to cause the actuator to move from the first position to the second position and from the second position to the first position along the rotational axis,. and wherein the magnetic actuator is magnetically biased into alignment with the ferromagnetic fingers to retain the actuator in each of the first and second positions.

2. The assembly as claimed in claim 1, wherein the second subassembly includes at least one biasing member for exerting at least one biasing force on the actuator along the rotational axis when the actuator moves between its first and second positions along the rotational axis.

3. The assembly as claimed in claim 1, wherein the second subassembly includes a pair of spaced biasing members for exerting corresponding biasing forces on the actuator in opposite directions along the rotational axis when the actuator moves between its first and second positions along the rotational axis.

4. The assembly as claimed in claim 1, wherein the second subassembly includes a hub adapted for coupling with the one of the members of the coupling apparatus and supported for rotation relative to the first subassembly about the rotational axis, the hub slidably supporting the actuator during shifting movement along the rotational axis.

5. The assembly as claimed in claim 4, wherein the second subassembly includes a pair of spaced stops supported on the hub to define the first and second positions of the actuator.

6. The assembly as claimed in claim 4, wherein the second subassembly includes a set of spaced guide pins sandwiched between an inner surface of the actuator and an outer surface of the hub and extending along the rotational axis, wherein the actuator slides on the guide pins during shifting movement of the actuator along the rotational axis and wherein the guide pins pilot the actuator on the hub.

7. The assembly as claimed in claim 1, wherein the stator includes a ferromagnetic housing having spaced apart fingers and an electromagnetically inductive coil housed between adjacent fingers.

8. The assembly as claimed in claim 7, wherein the actuator includes an inner part and an outer part having a magnetic annular ring sandwiched between a pair of ferromagnetic backing rings wherein the magnetic control force magnetically biases the fingers and their corresponding backing rings into alignment.

9. The assembly as claimed in claim 1, wherein the stator includes a pair of spaced electromagnetically inductive coils.

10. An electromechanical assembly to control the operating mode of a coupling apparatus having first and second coupling members supported for rotation relative to one another about a common rotational axis and at least one forward strut and at least one reverse strut for selectively mechanically coupling the members together, the assembly comprising:

a first subassembly including a first stator having at least one electromagnetically inductive first coil to create a first magnetic flux when the at least one first coil is energized and a second stator having at least one electromagnetically inductive second coil to create a second magnetic flux when the at least one second coil is energized, the first subassembly further including first ferromagnetic fingers adjacent the at least one first coil and second ferromagnetic fingers adjacent the at least one second coil; and a second subassembly including at least one bi-directionally movable first rod, each first rod having a free end adapted to actuate a forward strut of the coupling apparatus for selective, small displacement forward strut movement, and a first magnetic actuator operatively connected to each first rod for selective bi-directional shifting movement along the rotational axis between a first position of the first actuator which corresponds to a first mode of the coupling apparatus and a second position of the first actuator which corresponds to a second mode of the coupling apparatus, wherein a first magnetic control force is applied to the first actuator when the at least one first coil is energized to cause the first actuator to move from its first position to its second position and from its second position to its first position along the rotational axis, and wherein the first magnetic actuator is magnetically biased into alignment with the ferromagnetic fingers to retain the actuator in each of its first and second positions, and wherein the second subassembly further includes at least one bi-directionally movable second rod, each second rod having a free end adapted to actuate a reverse strut of the coupling apparatus for selective, small displacement reverse strut movement and a second magnetic actuator operatively connected to each second rod for bi-directional shifting movement thereof along the rotational axis between a first position of the second actuator which corresponds to a third mode of the coupling apparatus and a second position of the second actuator which corresponds to a fourth mode of the coupling apparatus, wherein a second control magnetic force is applied to the second actuator when the at least one second coil is energized to cause the second actuator to move from its first position to its second position and from its second position to its first position along the rotational axis, and wherein the second actuator is magnetically biased into alignment with the second ferromagnetic fingers to retain the second actuator in each of its first and second positions.

11. The assembly as claimed in claim 10, wherein the second subassembly includes at least one biasing first member for exerting at least one biasing force on the first actuator along the rotational axis when the first actuator moves between its first and second positions along the rotational axis and at least one biasing second member for exerting at least one biasing force on the second actuator along the rotational axis when the second actuator moves between its first and second positions along the rotational axis.

12. The assembly as claimed in claim 10, wherein the second subassembly includes a first pair of spaced biasing members for exerting corresponding biasing forces on the first actuator in opposite directions along the rotational axis when the first actuator moves between its first and second positions along the rotational axis and a second pair of spaced biasing members for exerting corresponding biasing forces on the second actuator in opposite directions along the rotational axis when the second actuator moves between its first and second positions along the rotational axis.

13. The assembly as claimed in claim 10, wherein the second subassembly includes a hub adapted for coupling with the one of the members of the coupling apparatus and supported for rotation relative to the first subassembly about the rotational axis, the hub slidably supporting the first and second actuators during corresponding shifting movement along the rotational axis.

14. The assembly as claimed in claim 13, wherein the second subassembly includes a first pair of spaced stops supported on the hub to define the first and second positions of the first actuator and a second pair of spaced stops supported on the hub to define the first and second positions of the second actuator.

15. The assembly as claimed in claim 13, wherein the second subassembly includes a set of spaced guide pins sandwiched between an inner surface of the first and second actuators and an outer surface of the hub and extending along the rotational axis, wherein the actuators slide on the guide pins during shifting movement of the actuators along the rotational axis and wherein the guide pins pilot the actuators on the hub.

16. The assembly as claimed in claim 10, wherein each stator includes a ferromagnetic housing having spaced apart fingers and an electromagnetically inductive coil housed between adjacent fingers.

17. The assembly as claimed in claim 10, wherein each actuator includes an inner part and an outer part having a magnetic annular ring sandwiched between a pair of ferromagnetic backing rings wherein the magnetic control forces magnetically bias the fingers and their corresponding backing rings into alignment.

18. The assembly as claimed in claim 10, wherein each stator includes a pair of spaced electromagnetically inductive coils.

19. The assembly as claimed in claim 10, wherein the second actuator has at least one aperture extending completely therethrough to allow each first rod to move bi-directionally therethrough.

20. The assembly as claimed in claim 1, wherein the second subassembly is adapted for coupling with one of the first and second coupling members to rotate therewith, the second subassembly being supported for rotation relative to the first subassembly about the rotational axis when coupled to the coupling apparatus.

21. The assembly as claimed in claim 10, wherein the second subassembly is adapted for coupling with one of the first and second coupling members to rotate therewith, the second subassembly being supported for rotation relative to the first subassembly about the rotational axis when coupled to the coupling apparatus.

22. An electromechanical assembly to control the operating mode of a coupling apparatus having first and second coupling members supported for rotation relative to one another about a common rotational axis and at least one strut for selectively mechanically coupling the members together, the assembly comprising:

a first subassembly including a stator having at least one electromagnetically inductive coil to create a magnetic flux when the at least one coil is energized; and a second subassembly including at least one bi-directionally movable rod, each rod having a free end adapted for connection to a strut of the coupling apparatus for selective, small displacement strut movement, and magnetic actuator operatively connected to each rod for selective bi-directional shifting movement along the rotational axis between a first position of the actuator which corresponds to a first mode of the coupling apparatus and a second position of the actuator which corresponds to a second mode of the coupling apparatus, wherein a magnetic control force is applied to the actuator when the at least one coil is energized to cause the actuator to move between the first and second positions along the rotational axis, wherein the actuator is magnetically latched in at least one of the positions, wherein the stator includes a ferromagnetic housing having spaced apart fingers and an electromagnetically inductive coil housed between adjacent fingers and wherein the actuator includes an inner part and an outer part having a magnetic annular ring sandwiched between a pair of ferromagnetic backing rings wherein the magnetic control force magnetically biases the fingers and their corresponding backing rings into alignment.

23. An electromechanical assembly to control the operating mode of a coupling apparatus having first and second coupling members supported for rotation relative to one another about a common rotational axis and at least one forward strut and at least one reverse strut for selectively mechanically coupling the members together, the assembly comprising:

a first subassembly including a first stator having at least one electromagnetically inductive first coil to create a first magnetic flux when the at least one first coil is energized and a second stator having at least one electromagnetically inductive second coil to create a second magnetic flux when the at least one second coil is energized; and a second subassembly including at least one bi-directionally movable first rod, each first rod having a free end adapted for connection to a forward strut of the coupling apparatus for selective, small displacement forward strut movement, and a magnetic first actuator operatively connected to each first rod for selective bi-directional shifting movement along the rotational axis between a first position of the first actuator which corresponds to a first mode of the coupling apparatus and a second position of the first actuator which corresponds to a second mode of the coupling apparatus, wherein a first magnetic control force is applied to the first actuator when the at least one first coil is energized to cause the first actuator to move between its first and second positions along the rotational axis and wherein the first actuator is magnetically latched in at least one of the positions, and wherein the second subassembly further includes at least one bi-directionally movable second rod, each second rod having a free end adapted for connection to a reverse strut of the coupling apparatus for selective, small displacement reverse strut movement and a magnetic second actuator operatively connected to each second rod for bi-directional shifting movement thereof along the rotational axis between a first position of the second actuator which corresponds to a third mode of the coupling apparatus and a second position of the second actuator which corresponds to a fourth mode of the coupling apparatus, wherein a second control magnetic force is applied to the second actuator when the at least one second coil is energized to cause the second actuator to move between its first and second positions along the rotational axis and wherein the second actuator is magnetically latched in at least one of the positions of the second actuator wherein each stator includes a ferromagnetic housing having spaced apart fingers and an electromagnetically inductive coil housed between adjacent fingers and wherein each actuator includes an inner part and an outer part having a magnetic annular ring sandwiched between a pair of ferromagnetic backing rings wherein the magnetic control forces magnetically bias the fingers and their corresponding backing rings into alignment.

* * * * *

UNITED STATES PATENT AND TRADEMARK OFFICE
CERTIFICATE OF CORRECTION

Page 1 of 1

PATENT NO. : 9,303,699 B2
APPLICATION NO. : 13/370507
DATED : April 5, 2016
INVENTOR(S) : John W. Kimes et al.

It is certified that error appears in the above-identified patent and that said Letters Patent is hereby corrected as shown below:

Claims

Column 10, Lines 29-30, Claim 1:

After "rotational axis" delete the "."

Signed and Sealed this
Nineteenth Day of July, 2016

Michelle K. Lee
*Director of the United States Patent and Trademark Office*